United States Patent Office 2,933,397
Patented Apr. 19, 1960

2,933,397
EGG WHITE COMPOSITION

Vincent F. Maturi, Summerville, N.J., Lawrence Kogan, Stamford, Conn., and Nicholas G. Marotta, Milltown, N.J., assignors to Standard Brands Incorporated, New York, N.Y., a corporation of Delaware No Drawing. Application November 3, 1959
Serial No. 850,538

20 Claims. (Cl. 99—113)

This application is a continuation-in-part of our copending application Serial No. 513.601 filed June 6, 1955 now abandoned.

This invention relates to the treatment of egg white, to improve its properties, particularly its whipping properties. The invention also includes the resulting products and the use of these products for various purposes and particularly in the manufacture of angel food cake.

It has been found that egg whites can be whipped to a good foam in a shorter time if they contain a small amount of an ester of a polyhydric alcohol having less than four carbon atoms and an aliphatic monobasic acid having two or three carbon atoms. The ester may be a mixed ester, i.e. one containing radicals derived from two or more different acids. Suitable esters, for example, are the acetic acid and propionic acid esters of glycerol, ethylene glycol, propylene glycol and trimethylene glycol. Some of these esters are more effective than others. Two or more of the esters may be used together.

The whipped egg whites of this invention may be used for various purposes. Those whipped with certain esters are particularly useful in the manufacture of cakes of the angel food type. Egg whites will normally give good cake volume when they are whipped to a foam density of about 0.12 g. per ml. If they are whipped too long, they usually produce cakes of lower volume. We have found that egg whites whipped with an acetic acid ester of glycerol will yield cakes of higher volume than egg whites which do not contain such an ester. Moreover, the higher volume is maintained also if the egg whites containing such esters are overbeaten.

It has been found that the overbeating tolerance of egg whites containing the aforementioned esters may be increased further if the pH of the egg whites is reduced by the addition of an acid, for example, pyrophosphoric acid or citric acid, or an acid salt, for instance, sodium dihydrogen phosphate, or a combination of the two, for instance, citric acid and sodium dihydrogen phosphate. Egg whites having the normal pH of about 9 do not give as stable or as stiff a foam as egg whites whose pH has been reduced. The pH may be reduced to between 5.0 and 8.9 and preferably to about 7.5 to 8.2. When both an ester and a pH reducing substance are added, full overbeating tolerance is obtained; that is, extra whipping does not result in a decrease in cake volume.

The amounts of the esters required to give a reduction in whipping time will vary depending upon their constitution. These amounts will generally be between a fraction of 1% and 2% based on the weight of the liquid egg white. As indicated in the specific examples, amounts below about 1% are generally sufficient. It is, of course, desirable to use an amount which will give the maximum improvement and avoid the use of an excessive amount. In the case of triacetin, for instance, the amount used is preferably between 0.1% and 1.0% by weight of liquid egg white.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

Example 1

A batch of liquid egg whites was divided into a number of 600 gram portions. One portion was used as a control and various amounts of triacetin were added to the other portions as indicated in the table below. Each portion was then whipped to a density of 0.12 g. per ml. The time (minutes) required to reach this density is indicated.

| Percent Triacetin | Whipping Time |
|---|---|
| None (control) | 4.60 |
| 0.05 | 3.45 |
| 0.08 | 2.75 |
| 0.10 | 2.20 |
| 1.00 | 2.00 |
| 2.00 | 2.00 |
| 3.00 | 10.00 |

It will be noted that the egg whites containing up to 2% triacetin were whipped to the normal density faster than the control, and at the level of 0.1% they reached this density in less than half the time.

Example 2

The following table shows the effectiveness of 0.15% triacetin in shortening the whipping time of liquid egg whites and maintaining angel food cake volume in regular bakery tests using 1000 g. batches. In this and the following tables, normal beat signifies a foam density of 0.12 g. per ml. and overbeat signifies a foam density of 0.082 g. per ml.

| Sample | Type of Beat | Beating Time (min.) | Cake Volume (ml.) |
|---|---|---|---|
| Control | Normal | 4 | 2,545 |
|  | Overbeat | 8.5 | 2,350 |
| Triacetin | Normal | 1.5 | 2,600 |
|  | Overbeat | 5.5 | 2,650 |

It is evident that the triacetin sample was brought to normal beat volume more than 50% faster than the corresponding control sample. Moreover, in the case of the overbeaten triacetin sample the cake volume was about 12% higher than in the case of the overbeaten control.

Example 3

The next table shows the effect of the addition to liquid egg whites of 0.1% triacetin along with suitable amounts of sodium dihydrogen phosphate and citric acid to reduce the pH of the egg whites from 9 to about 7.8. Also shown is the effect of 0.15% pyrophosphoric acid along with 0.1% of triacetin.

NORMAL BEAT

| Sample | Cake Volume (ml.) | Minutes | pH |
|---|---|---|---|
| Control | 2,750 | 5.12 | 9.0 |
| Triacetin, Citric Acid and NaH$_2$PO$_4$ | 2,670 | 2.15 | 7.8 |
| Triacetin and Pyrophosphoric Acid | 2,700 | 2.31 | 7.8 |

OVERBEAT

| Sample | Cake Volume (ml.) | Minutes | pH |
|---|---|---|---|
| Control | 2,470 | 18.05 |  |
| Triacetin, Citric Acid and NaH$_2$PO$_4$ | 2,750 | 13.25 |  |
| Triacetin and Pyrophosphoric Acid | 2,890 | 14.01 |  |

It will be observed that volume of the cake made from overbeaten triacetin samples of reduced pH was equal to or higher than the volume of the cake made from the control which was given the normal beat.

Example 4

The following table shows the effectiveness of various esters and mixtures of esters in decreasing the whipping time of liquid egg whites. The decrease in whipping time is stated as the percent decrease compared to the whipping time of a control having no additive. In each case, the control and the composition compared with it were whipped to the same density (0.11 to 0.14 gram per ml.).

| No. | Ester | Amount Used (Percent) | Whipping Time Decrease (Percent) |
|---|---|---|---|
| 1 | Monoacetin | 0.10 | 19.4 |
| 2 | Monopropionin | 0.10 | 40.0 |
| 3 | Glycerine monoacetate dipropionate | 0.05 | 33.3 |
| 4 | Propylene glycol monoacetate | 0.05 | 33.3 |
| 5 | Propylene glycol diacetate | 0.10 | 30.6 |
| 6 | Trimethylene glycol diacetate | 0.10 | 27.4 |
| 7 | Ethylene glycol diacetate | 0.10 | 24.6 |
| 8 | Tripropionin | 0.01 | 13.7 |
| 9 | Diacetin | 0.10 | 25.8 |
| 10 | Ethylene glycol dipropionate | 0.30 | 12.5 |
| 11 | 2-hydroxy ethyl acetate | 0.75 | 20.0 |
| 12 | Propylene glycol dipropionate | 0.33 | 48.7 |
| 13 | Trimethylene glycol dipropionate | 0.167 | 24.7 |

The esters enumerated in the foregoing table had the composition indicated below.

| Ester | Composition |
|---|---|
| 1 | 80% monoacetin; 20% diacetin. |
| 2 | 90% monopropionin; 10% tripropionin. |
| 3 | 84% glycerine monoacetate dipropionate; 1% monopropionin; 4% dipropionin; 11% tripropionin. |
| 4 | 80% propylene glycol monoacetate; 9.7% propylene glycol diacetate; 7.7% propylene glycol. |
| 5 | 90% propylene glycol diacetate; 10% propylene glycol. |
| 6 | 99% pure. |
| 7 | Do. |
| 8 | 95% tripropionin; 5% monopropionin. |
| 9 | 85% diacetin; 9% monoacetin; 5% triacetin. |
| 10 | Purchased commercial preparation. |
| 11 | Do. |
| 12 | Prepared by esterification of propylene glycol with excess of propionic acid. |
| 13 | Prepared by esterification of trimethylene glycol with excess of propionic acid. |

While in the foregoing we have referred specifically to liquid egg whites, it is to be understood that the invention is also applicable to the treatment of dried egg whites. The esters employed in this invention may be added to the egg whites either before or after drying. When the dried egg whites are reconstituted with water substantially the same improvement in whipping properties is obtained as with undried egg whites. This improvement is particularly advantageous in connection with dry mixes for use in the preparation of cakes of the angel food type.

The egg white compositions in this invention whether liquid or dried may contain other materials besides the esters, for instance, sugar or other flavoring materials, and acidifiers such as cream of tartar.

Example 5

A batch of dried egg white was divided into five portions. One portion was used as a control, and triacetin was added to the other four portions in the amounts indicated in the table below. Each portion was reconstituted with water in a ratio of 75 grams of egg white solids to 525 grams of water. In each case the reconstituted mixture was whipped until it reached a normal beat volume, the time required being shown in the following table:

| Percent by Weight Triacetin (reconstituted whites basis) | Normal Beat Time |
|---|---|
| 0.0 (Control) | 1.20 |
| 0.025 | 0.50 |
| 0.05 | 0.41 |
| 0.10 | 0.42 |
| 0.20 | 0.38 |

In Examples 2 and 3, the angel food cake was prepared by the foam method using a standard recipe. In this method the egg whites are whipped to a wet peak, and then the salt, cream of tartar or other acidifier and a portion of the sugar are added slowly while the whipping is continued. After whipping is complete, the remainder of the sugar and all of the flour are added and folded in by hand to complete the batter. The esters employed in the present invention are incorporated in the egg whites and, if desired, their pH is adjusted before whipping is started.

Angel food cake may also be prepared by the meringue method from the egg white compositions of the present invention. In this method the egg whites are whipped with the salt, all or part of the cream of tartar or other acidifier and part of the sugar. After whipping is complete, the remainder of the sugar and all of the flour are folded in. Overbeating tolerance obtained by the use of esters like triacetin is not as well defined with this type of mix, since the sugar and the cream of tartar prolong the beating time and thus reduce the chances of overbeating. The preparation of angel food cake by the meringue method is illustrated in the following example:

Example 6

Cakes were prepared from three commercial angel food cake mixes. These mixes consist of two packages, one comprising dried egg white, sugar and cream of tartar or other acidifier, and the other comprising cake flour, sugar, salt and additional acidifier. The contents of the first package are combined with water and the mixture is whipped to provide a whip having stiff peaks. The contents of the second package are then folded into the whipped egg white. Cakes prepared from each of these mixes were compared with cakes made from the same mixes containing 300 mgs. of triacetin which was added to the dried egg white portion. This level of triacetin in about 0.1% on a reconstituted egg white basis. The results obtained are shown in the following table.

BRAND A

|  | Beating Time [1] (min.) | Batter Consistency | Cake Volume (ml.) | Cake Score |
|---|---|---|---|---|
| (a) Control | 5.25 | normal | 4,420 | normal. |
| (b) with triacetin | 4.25 | much better than normal. | 4,470 | same. |

BRAND B

|  | Beating Time [1] (min.) | Batter Consistency | Cake Volume (ml.) | Cake Score |
|---|---|---|---|---|
| (a) Control | 5.25 | normal | 4,092 | normal. |
| (b) with triacetin | 3.75 | much better than normal. | 4,326 | same. |

BRAND C

|  | Beating Time [1] (min.) | Batter Consistency | Cake Volume (ml.) | Cake Score |
|---|---|---|---|---|
| (a) Control | 7.00 | slightly weak | 4,470 | about normal. |
| (b) with triacetin | 5.70 | better than normal. | 4,700 | improved. |

[1] The first 2 minutes of time are used to reconstitute the egg white and dissolve the other ingredients.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

We claim:

1. A process of preparing an egg white composition having improved whipping properties, which comprises incorporating in egg whites an ester of a polyhydric alcohol having less than four carbon atoms and an acid of the group consisting of aliphatic monobasic acids having two carbon atoms and aliphatic monobasic acids having three carbon atoms, in an amount within the range from a fraction of 1% to about 2% based on the weight of liquid egg white effective to substantially decrease the whipping time of the egg white.

2. A process as claimed in claim 1 wherein the ester is an acetic acid ester of a polyhydric alcohol having less than four carbon atoms.

3. A process as claimed in claim 2 wherein the ester is an acetic acid ester of glycerol.

4. A process as claimed in claim 2 wherein the ester is diacetin.

5. A process as claimed in claim 2 wherein the ester is triacetin.

6. A process as claimed in claim 1 wherein the ester is monopropionin.

7. A process as claimed in claim 2 wherein the ester is an acetic acid ester of propylene glycol.

8. A process as claimed in claim 2 wherein the ester is propylene glycol diacetate.

9. A process as claimed in claim 2 wherein the ester is trimethylene glycol diacetate.

10. A process as claimed in claim 1 wherein in addition to the ester, an edible acid substance is incorporated in the egg whites in an amount sufficient to reduce the pH to between about 7.5 and about 8.2.

11. An egg white composition obtained by the process defined in claim 1.

12. An egg white composition obtained by the process defined in claim 2.

13. An egg white composition obtained by the process defined in claim 3.

14. An egg white composition obtained by the process defined in claim 4.

15. An egg white composition obtained by the process defined in claim 5.

16. An egg white composition obtained by the process defined in claim 6.

17. An egg white composition obtained by the process defined in claim 7.

18. An egg white composition obtained by the process defined in claim 8.

19. An egg white composition obtained by the process defined in claim 9.

20. An egg white composition obtained by the process defined in claim 10.

References Cited in the file of this patent
UNITED STATES PATENTS

| | | |
|---|---|---|
| 2,166,070 | Littlefield | July 11, 1939 |
| 2,182,209 | Newton et al. | Dec. 5, 1939 |
| 2,614,046 | Werbin | Oct. 14, 1952 |
| 2,637,654 | Kothe | May 5, 1953 |
| 2,692,201 | Conrad | Oct. 19, 1954 |